(No Model.) 4 Sheets—Sheet 1.

J. A. TILDEN.
WATER METER WITH REVOLVING NON ROTATING PISTON.

No. 357,159. Patented Feb. 1, 1887.

WITNESSES
J. Frank Charnock
Fred. B. Dolan

INVENTOR
James A. Tilden
by his attys
Clarke & Raymond (No Model.) 4 Sheets—Sheet 2.

J. A. TILDEN.
WATER METER WITH REVOLVING NON ROTATING PISTON.

No. 357,159. Patented Feb. 1, 1887.

WITNESSES
J. Frank Charnock
Fred B. Dolan

INVENTOR
James A. Tilden
by his attys
Clarke & Raymond (No Model.) 4 Sheets—Sheet 3.

J. A. TILDEN.
WATER METER WITH REVOLVING NON ROTATING PISTON.

No. 357,159. Patented Feb. 1, 1887.

WITNESSES
J Frank Charnock
Fred. B. Dolan

INVENTOR
James A. Tilden
by his attys
Clarke & Raymond

N. PETERS, Photo-Lithographer, Washington, D. C.

(No Model.) 4 Sheets—Sheet 4.
J. A. TILDEN.
WATER METER WITH REVOLVING NON ROTATING PISTON.
No. 357,159. Patented Feb. 1, 1887.
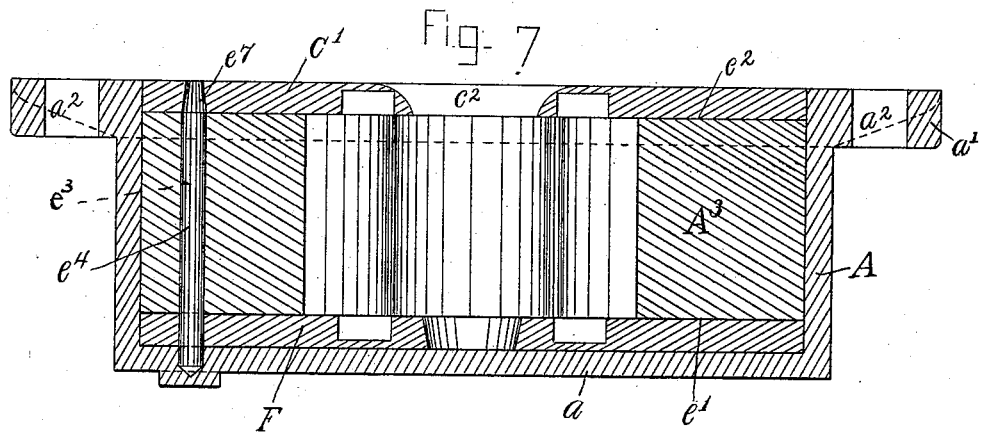
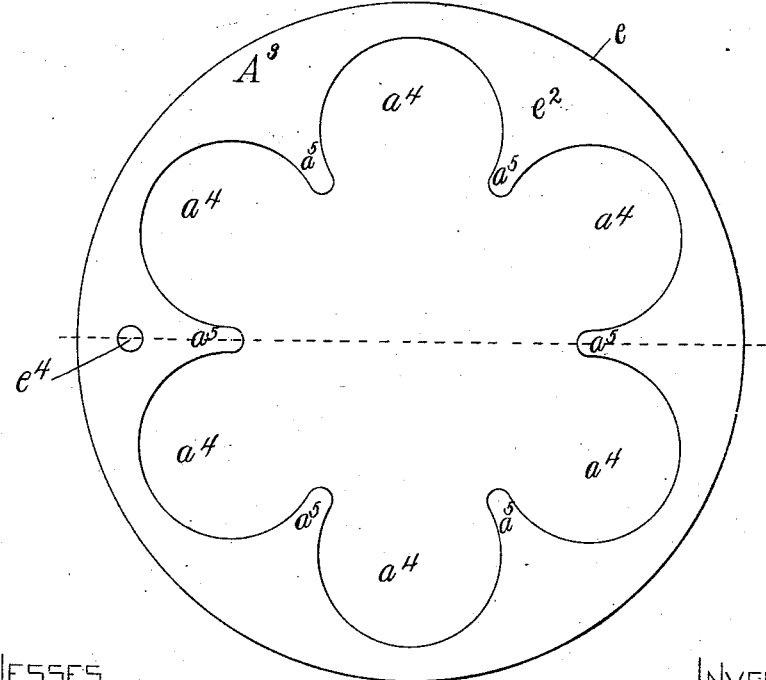
WITNESSES
J. Frank Charnock
Fred. B. Dolan.
INVENTOR
James A. Tilden
by his atty.
Clarke & Raymond.

UNITED STATES PATENT OFFICE.

JAMES A. TILDEN, OF HYDE PARK, MASSACHUSETTS.

WATER-METER WITH REVOLVING NON-ROTATING PISTON.

SPECIFICATION forming part of Letters Patent No. 357,159, dated February 1, 1887.

Application filed August 15, 1885. Serial No. 174,463. (No model.)

*To all whom it may concern:*

Be it known that I, JAMES A. TILDEN, of Hyde Park, in the county of Norfolk in the State of Massachusetts, a citizen of the United States, have invented a new and useful Improvement in Water-Meters, Motors, and Pumps, of which the following is a full, clear, and exact description, refererence being had to the accompanying drawings, forming a part of this specification, in explaining its nature.

The invention is an improvement upon that described in my Letters Patent of the United States, No. 324,503, dated August 18, 1885.

It relates, first, to the position of the measuring-chamber in relation to the inlet and outlet and distributing-chamber; second, to forming the measuring-chamber walls of a different material from the casing, whereby increased durability and efficiency are obtained, and, with certain constructions, economy in the manufacture produced; third, to a connection of peculiar shape and operation between the piston-spindle and the shaft of the reducing-gear; and, fourth, to the arrangement of the reducing-gear in the exhaust-passage.

Figure 1:
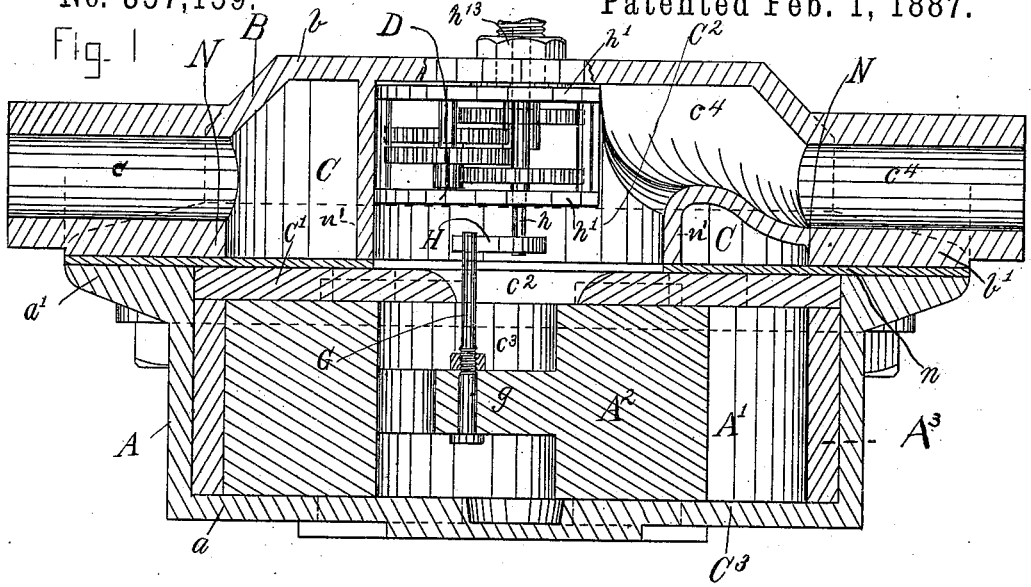
Figure 2:
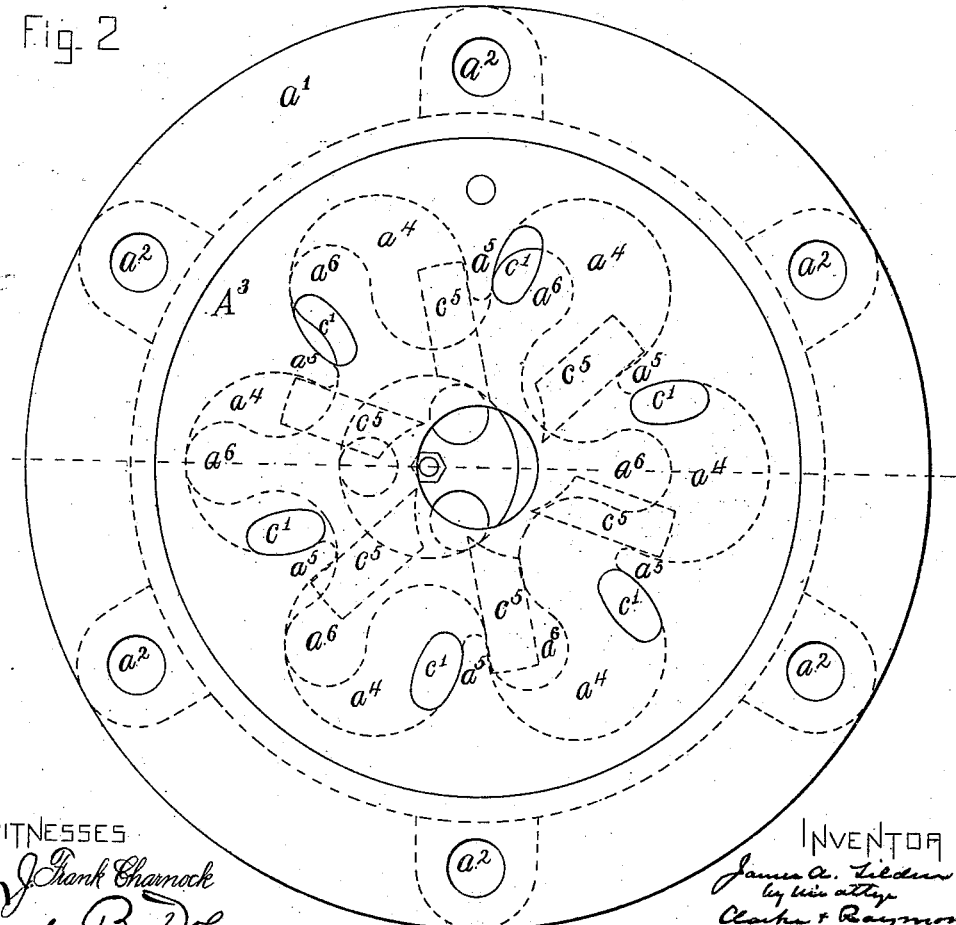
Figure 3:
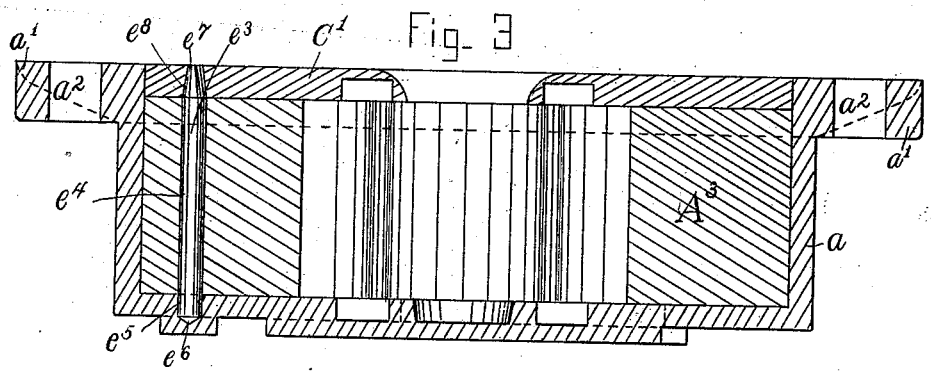
Figure 4:
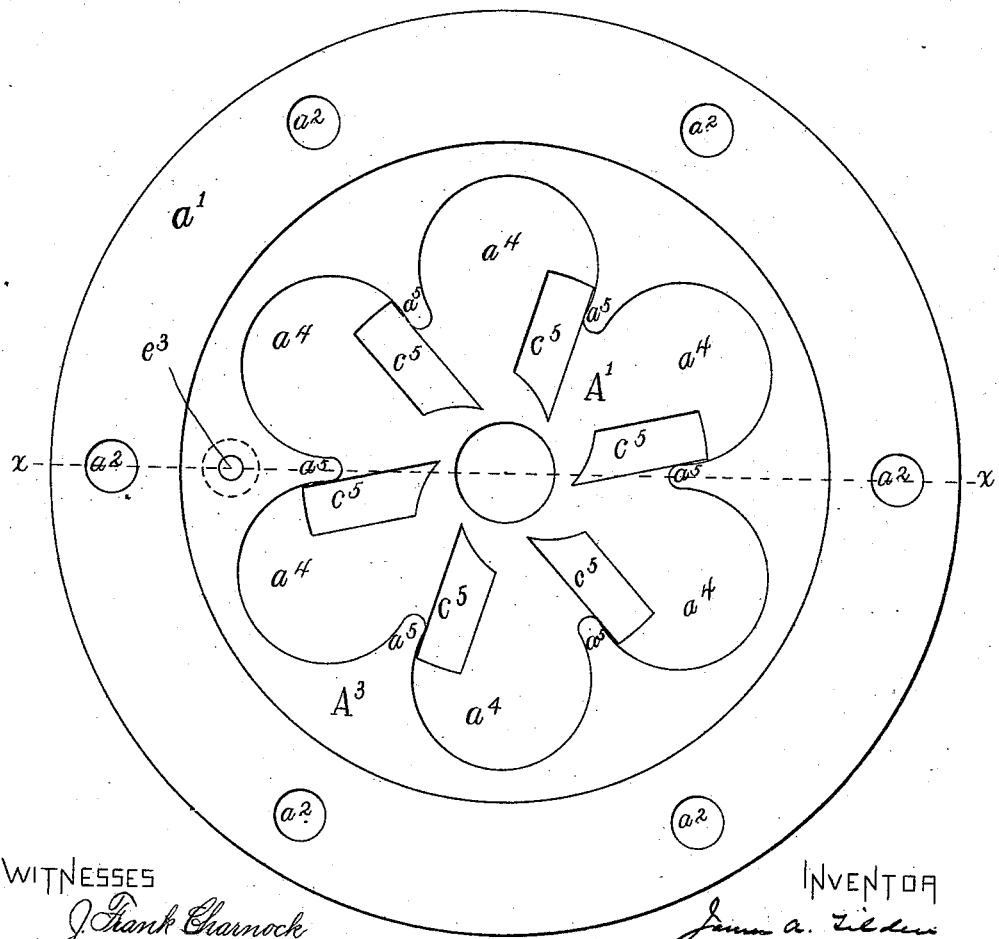
Figure 5:
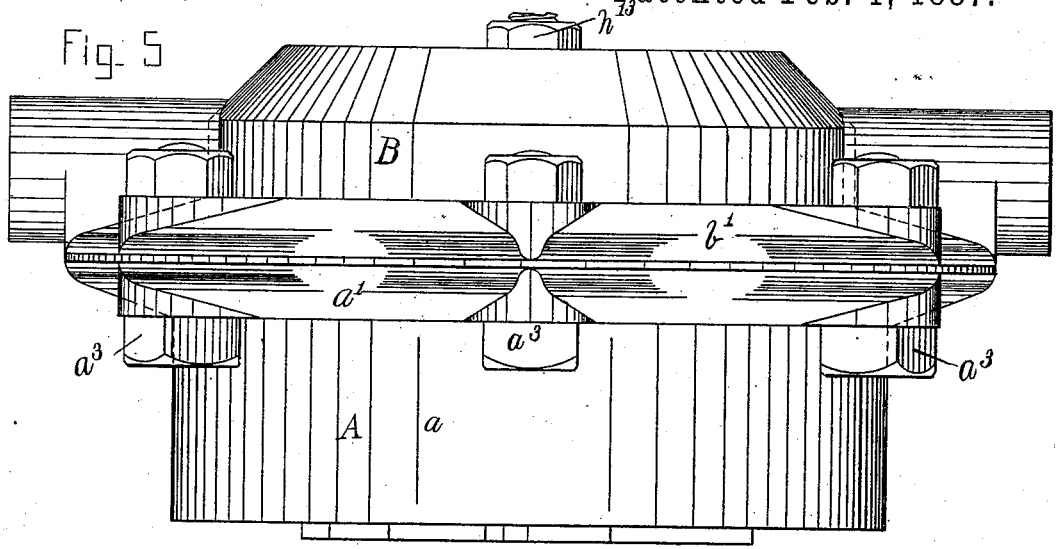
Figure 6:
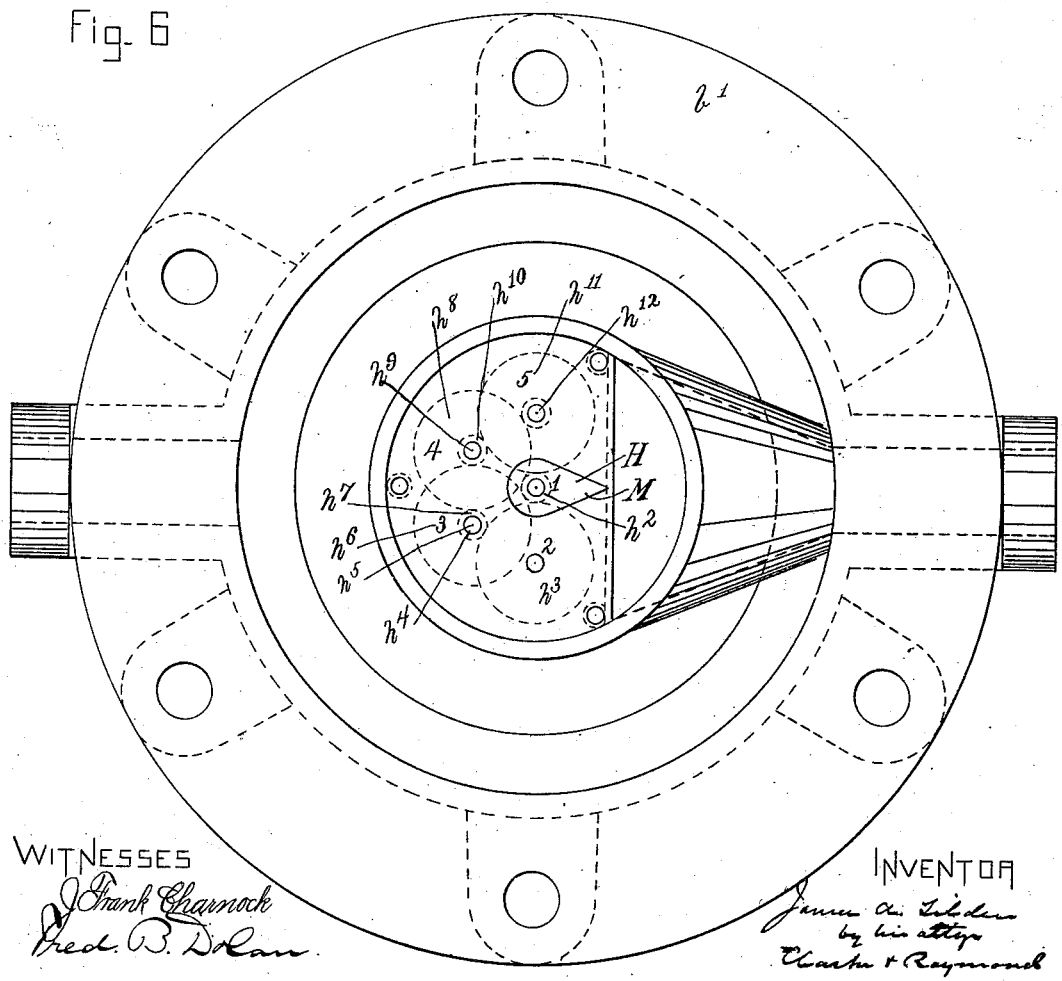

Referring to the drawings, Figure 1 represents a vertical central section of the meter. Fig. 2 is a view in plan of the lower section of the casing with the upper port-plate in position, showing in dotted outline the shape of the measuring-chamber, piston, and escape-ports. Fig. 3 is a vertical section of the lower section of the meter, the piston being removed, upon the line $x\ x$ of Fig. 4. Fig. 4 is a plan view of the section represented in Fig. 3, the upper port-plate being removed. Fig. 5 is a view in elevation of the meter-casing. Fig. 6 is an inverted view in plan of the upper section of the meter. Fig. 7 is a view in vertical section of the lower section or part of the meter, representing a modification, hereinafter referred to. Fig. 8 is a view in plan of the wall of the measuring-chamber.

A is the lower section of the meter, and B the upper section. The lower section comprises the shell or casing $a$, having the annular flange $a'$, in which are formed the holes $a^2$ for the bolts $a^3$, used in fastening the two sections together. The lower section, A, contains the measuring-chamber A' and the piston A$^2$. The chamber is divided into measuring-spaces $a^4$ by the portions $a^5$ of the wall, and the piston has the lobes or sections $a^6$, which enter these measuring-spaces, and they operate in connection with the walls of each space, as described in my said patent.

The section B has the casing $b$, which is provided with the annular flange $b'$, through which bolt-holes in continuation of those in the flange $a'$ extend. It contains the distributing-chamber C into which the supply passage or inlet $c$ enters, and which is connected with each of the measuring-spaces $a^4$ by ports $c'$ formed in the port-plate C'. This section also has the chamber C$^2$, which is of a size sufficient to receive the reducing-gear D, and which is connected with the measuring-chamber by the centrally-arranged passage or opening, $c^2$, in the port-plate C', the said passage or opening connecting with the central opening or chamber, $c^3$, in the piston A$^2$. The chamber or passage C$^2$ also has the outlet or escape passage $c^4$. The measuring-spaces $a^4$ are connected with the piston-space $c^3$ and outlet $c^2$ by the escape-ports $c^5$, which are formed in the under surface of the port-plate C' and in the upper surface of the lower plate C$^3$, and they are shaped and arranged substantially as represented in Figs. 2 and 4, and as described in my said patent.

In order to increase the durability and efficiency of the meter, I have made the section or part A$^3$, which forms the wall of the measuring-chamber, of a material possessing greater wearing properties and durability than brass, and the material which I prefer to use for this purpose is hard vulcanized rubber or gutta-percha, or rubber compound. In Fig. 8 I have represented a plan view of this wall. It has its outer surface, $e$, shaped to fit the interior of the casing $a$, and its lower surface, $e'$, and upper surface, $e^2$, are parallel. Its inner surface is shaped to provide the measuring-spaces $a^4$. It is fastened in place by the pin $e^3$, which extends through a hole, $e^4$, in the wall, its lower end, $e^5$, entering the recess $e^6$ in the casing $a$, and its upper end, $e^7$, which is made somewhat tapering, enters the hole $e^8$ in the port-plate C'. Of course this section or wall can be fastened to the casing $a$ in any desirable way. This wall, when made of vulcanized stock, is molded to shape in suitable molds, and under great pressure.

While I have mentioned the wall as made of hard rubber or gutta-percha, or stock containing rubber or gutta-percha, I would say that I do not confine myself to these materials, but may use any other material which shall be their equivalent for the purposes of durability and efficiency.

I would further state that for the purposes of economy the outer casing, $a$, of the meter may be made of iron and the wall $A^3$ be made of brass or composition, or of some non-corrodable material. In this event, however, it will be necessary to provide a removable plate, F, of brass or suitable non-corrodable material, which covers the bottom of the casing $a$, as shown in Fig. 7, and has the lower series of escape-ports, $c^5$, arranged therein. When this construction is used, the pin $e^4$ is also used for fastening this plate in place, the pin extending through the hole formed therein, as represented in Fig. 7. I have found it desirable, also, to make the piston $A^2$ of hard vulcanized rubber or rubber stock, gutta-percha or gutta-percha stock, or a mixture of both or some equivalent material possessing like durability; and it is, when made of rubber or gutta-percha, molded to shape under great pressure and vulcanized.

The piston supports or carries the centrally-arranged stem or pin, G, which extends upward from the support or diaphragm $g$, which may be integral with the remainder of the piston or be a separate piece carried thereby or attached thereto. This pin extends upward through the passage $c^2$, its end projecting into the chamber $C^2$ containing the reducing-gear, and arranged to bear against the wedge-shaped arm or piece H, which is shaped in plan as represented in Fig. 6. This wedge-shaped connection is carried at the end of the shaft $h$ of the reducing-gear, and upon the movement of the piston the pin or spindle G is caused to describe a circular path, bears against the side of the arm or connection H, revolves it, and gives motion to the reducing-gear and the register. (See Fig. 1.)

The reducing-gear shown comprises the shaft $h$, which has suitable bearings in the frame or casing $h'$ and carries the pinion $h^2$, which meshes with the gear $h^3$, which in turn engages the pinion $h^4$ on the shaft $h^5$, having the gear $h^6$, and a pinion, $h^7$, on the shaft $h^5$ engages with the gear $h^8$ on the shaft $h^9$, and a pinion, $h^{10}$, on the said shaft $h^9$ engages with the gear $h^{11}$ on the shaft $h^{12}$, which passes through the stuffing-box $h^{13}$ (see Fig. 1) and operates the registering mechanism.

It will be seen that the connection H has the surface M, against which the spindle or pin G bears or comes in contact, and is tangential to the circle of revolution of the hub, and that if it is in any degree retarded in its revolution it must operate to cause the spindle or pin G to throw outwardly toward its outer end, as this is the line of the least friction; and as it does require, on account of the friction of the parts, a somewhat slight power to move the piece H, it follows that this power is exerted in causing the pin or spindle to ride outwardly, or rather to be maintained in its outermost position in its relation to the center of the shaft $h$, and this action of the parts I have found of benefit in maintaining a close or tight contact between the wall of the piston and that of the measuring-spaces, especially when the water-pressure upon the piston is exceedingly light.

It will be seen that the port-plate C' rests upon the wall $A^3$ of the measuring-chamber, and that it is held locked in place between it and the shoulder N of the upper section, B; also, that there is interposed between the two sections a packing-ring, $n$, which, of course, has holes formed therein in continuation of the ports $c'$.

The connection H is attached to the shaft $h$, in order to save parts and expense; but, of course, it may be placed upon an independent support to engage with the post or spindle G, if desired.

Of course the shape of the measuring-spaces and of the piston may be varied, as intimated in my application above referred to, and, of course, in this event the shape of the interior surface of the movable or independent wall will be correspondingly changed.

It will be observed that the piece H has another function from those above described, in that, on account of its shape and location, it prevents the piston from becoming central in the chamber A', and so holds it or locates it in said chamber that on the admission of pressure thereto the piston, not being centrally located, is immediately forced or brought into contact with the wall of the measuring-chambers. It will also be seen that the packing-ring $n$ serves to pack the space between the lower edge of the wall $n'$, which separates the distributing-chamber from the exit-passage, and the port-plate C'.

Having thus fully described my invention, I claim and desire to secure by Letters Patent of the United States—

1. The combination, in a meter, motor, or pump, of the chamber A', having the measuring-spaces $a^4$, the piston $A^2$, shaped as specified, the post or spindle G, and the rotating connecting device H, having the tangential surface $m$, substantially as and for the purposes described.

2. The combination of the chamber A', having the measuring-spaces $a^4$, the piston $A^2$, shaped as specified, and having the stem or spindle G, the reducing-gear D, its shaft $h$, and the rotating connecting device H, having the tangential surface or edge M, against which the spindle or pin G bears while it is rotating, all substantially as described.

3. The combination, in a water-meter, of the piston-chamber, the loose piston $A^2$, held and moved in contact with the walls of the piston-chamber by hydraulic action only, as specified, and a device or stop for preventing the piston from taking a central position in the said piston-chamber when it is not in operation, substantially as described.

4. A fluid-meter having a piston-chamber and a loose piston maintained in contact with the walls of said chamber and confined in its path during operation by hydraulic action, as specified, and a register connected with the piston by an arm or connecting device, substantially as described, which is adapted to transmit the movement of the piston to the register and at the same time, by the friction or retardation of the register, to assist in maintaining the contact of the loose piston with the walls of the chamber, substantially as described.

JAMES A. TILDEN.

In presence of—
F. F. RAYMOND, 2d,
FRED. B. DOLAN.